United States Patent [19]
Althaus et al.

[11] Patent Number: 4,865,409
[45] Date of Patent: Sep. 12, 1989

[54] COUPLING ARRANGEMENT FOR COUPLING LIGHT OF A SEMICONDUCTOR LASER DIODE INTO A MULTIMODE GLASS FIBER

[75] Inventors: Hans-Ludwig Althaus, Lappersdorf; Walter Proebster, Munich, both of Fed. Rep. of Germany

[73] Assignee: Siemens Aktiengesellschaft, Berlin and Munich, Fed. Rep. of Germany

[21] Appl. No.: 250,894

[22] Filed: Sep. 29, 1988

[30] Foreign Application Priority Data

Sep. 30, 1987 [DE] Fed. Rep. of Germany ....... 3733019

[51] Int. Cl.$^4$ ................................................ G02B 6/32
[52] U.S. Cl. .............................. 350/96.18; 350/96.15; 350/96.17; 350/96.20
[58] Field of Search ............... 350/96.15, 96.17, 96.18, 350/96.19, 96.20, 96.21; 250/227; 357/17, 19

[56] References Cited

U.S. PATENT DOCUMENTS

| | | | |
|---|---|---|---|
| 3,674,337 | 7/1972 | Marcatili | 350/96.17 |
| 3,864,019 | 2/1975 | Smolinsky et al. | 350/96.15 |
| 3,910,677 | 10/1975 | Becker et al. | 350/96.18 |
| 4,270,134 | 5/1981 | Takeda et al. | 357/19 |
| 4,413,879 | 11/1983 | Berthold, III et al. | 350/96.19 |
| 4,490,020 | 12/1984 | Sakaguchi et al. | 350/96.18 |
| 4,795,228 | 1/1989 | Schneider | 350/96.18 |
| 4,812,005 | 3/1989 | Heywang | 350/96.20 |
| 4,824,195 | 4/1989 | Khoe | 350/96.18 |
| 4,824,202 | 4/1989 | Auras | 350/96.18 |

FOREIGN PATENT DOCUMENTS

| | | | |
|---|---|---|---|
| 0063504 | 10/1982 | European Pat. Off. | 350/96.17 X |
| 3035858 | 5/1982 | Fed. Rep. of Germany | 350/96.15 X |
| 57-204017 | 12/1982 | Japan | 350/96.18 X |
| 58-202413 | 11/1983 | Japan | 350/96.15 X |
| 60-166906 | 8/1985 | Japan | 350/96.18 X |

OTHER PUBLICATIONS

The Trans. of the IECE of Japan, vol. E-64, No. 9, 9/81, Kuwahara et al., pp. 612–613.
IEEE Press, 1976, pp. 247–248, D. Globe.
Sixth Eugopean Conf., 9/80, Univ. of N.Y., pp. 95–98, White et al.

Primary Examiner—William L. Sikes
Assistant Examiner—Brian M. Healy
Attorney, Agent, or Firm—John F. Moran

[57] ABSTRACT

A coupling arrangement for coupling light of a semiconductor laser diode into a multimode glass fiber. The laser diode emits light along a first optical axis, and the glass fiber receives this light through a light entry surface and transmits it along a second optical axis. The received light forms a maximum intersection angle with the second optical axis which angle is greater than it would be in case both axes coincided. In a preferred embodiment, the laser light is emitted in form of a wedge having a plane of symmetry which bisects the angle of aperture of this wedge and contains the first optical axis. Best results are obtained in this embodiment, if the angle of aperture is about 10° and the maximum intersection angle is up to 8°.

2 Claims, 1 Drawing Sheet

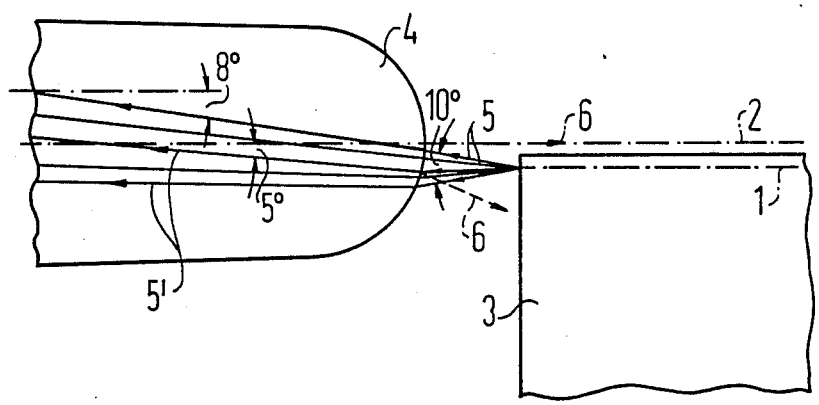

COUPLING ARRANGEMENT FOR COUPLING LIGHT OF A SEMICONDUCTOR LASER DIODE INTO A MULTIMODE GLASS FIBER

BACKGROUND OF THE INVENTION

The invention relates to an arrangement for coupling light. In particular, it relates to an arrangement for coupling light of a semiconductor laser diode into a multimode glass fiber.

If light signals are emitted by a laser diode and directed through a multimode glass fiber, they are normally distorted by noise components. This noise originates at dissipated plug connects, which are unavoidable due to fluctuations in the light intensity distribution in the fiber core. This problem is usually referred to as "modal noise". Its cause is the unstable interference of the coherently excited fiber modes having phase velocities which are different and fluctuate significantly in the optical spectrum. Phase velocity fluctuations are caused, for example, by mechanical vibrations of the fiber and by fluctuations in the optical emission spectrum of the laser diode. The light intensity noise varies less the less connector loss and the greater the number of excited fiber modes and spectral laser emission modes. Operationally stable 1.3 micrometer semiconductor laser diodes, however, have narrow line widths (smaller than 5 nanometer) with only a few emission modes. The currently used fiber couplings are highly efficient, but excite only a few fiber modes. This situations is especially unfavorable with respect to the above described light intensity noise in multimode fiber transmission lines. If a multimode lightwave guide is used for long distance transmissions, even in digital transmission systems (for example at 140 megabytes per second) the operation is occassionally disturbed, in spite of low attenuation values 1 dB of the used plug connections.

Attempts at remedying this have been made using specific light emitters or fibers. So, gain guided laser diodes with low coherence and a multitude of spectral emission modes, respectively, (GaAs/GaAlAs oxide strip lasers) are employed for a 850 nanometer operating wavelength. Or, the fiber mode characteristic is improved by using fiber mode mixers. Such mixers are, however, mechanically elaborate and, to our knowledge, have not yet been used in practice. In fact, all these attempts have failed, so far, to provide a setting which ensures a stable operation under all conditions. This situation can partly be attributed to the fact that an additional reason for instability, namely the distortions created by light reflected from the fiber back into the laser, has not properly been taken into account.

SUMMARY OF THE INVENTION

A principle object of this invention is to provide an arrangement for coupling light of a semiconductor laser diode into a multimode glass fiber, said arrangement having a significantly increased number of effectively excited fiber modes.

A further object of this invention is to provide an arrangement for coupling light of a semiconductor laser diode into a multimode glass fiber, in which arrangement the light feedback from the fiber into the laser diode is reduced.

Still another object of this invention is to provide a mechanically simple arrangement for coupling light of a semiconductor laser diode into a multimode glass fiber.

Yet another object of this invention is to provide a light coupling arrangement which is improved over the art.

The present invention is directed to a coupling arrangement comprising a semiconductor laser diode and a multimode glass fiber. The laser emits light along a first optical axis, and the glass fiber, which has a light entry surface, receives the emitted light through its light entry surface and propogates it along a secod optical axis. The received light beams form different intersection angles with the second optical axis. Both optical axes extend apart from, and parallel with, each other such that the maximum intersection angle has value which is greater than the value it would have, if both axes coincided.

In a first embodiment of the invention, the laser diode emits light in form of a wedge with a certain angle of aperture and a plane bisecting the angle of aperture and containing the first optical axis. Again, the second optical axis is offset with respect to the plane of symmetry such that the maximum intersection angle is increased. In a typical example the angle of aperture is about 10° and the maximum intersection angle has a value up to about 8°.

In another embodiment of the invention, the light entry surface of the glass fiber is rounded off in order to couple in as much as laser light as possible.

It is of particular advantage, if the light source of a arrangement according to this invention is of a module design.

The foregoing and other objects, features and advantages of the invention will be apparent from the following more particular description of a preferred embodiment of the invention, as illustrated in THE FIGURE.

DETAILED DESCRIPTION OF THE PREFERRED EMBODIMENT

The figure shows a coupling arrangement according to the invention in a simplified lateral view. The coupling arrangement consists of a laser diode 3, for example a 1.3 μm MCRW laser diode, and a multimode glass fiber 4, for example a graded-index fiber with a diameter of 50 μm. Shown is the grounded off ("tapered" 0 end of this fiber. Laser diode 3 has an optical plane which extends perpendicular to the drawing plane at the level of the strip-light laser-active zone, i.e. the pn junction, of diode 3, and is symbolized as axis 1.

Glass fiber 4 has an optical axis 2 which extends parallel with plane 1 in the drawing plane. The distance between axis 1 and axis 2 is such that most light beams emitted from the diode form angles with axis 2 within the glass fiber 4 which are greater than in the case of coinciding axes. In particular, the maximum intersection angle is greater than in the conventional configuration with congruent axes. in the present example, the laser diode 3 emits light in form of a wedge 5 having an angle of aperture of approximately 10°. The laser light received by the glass fiber 4, intersects its optical axis 2 with angles up to 8°. Light which is reflected at the light entry surface of glass fiber 4, travels along the direction of arrow 6 and, therefore, acts upon the laser-active region of laser diode 3 far less than in the case of a optimum light coupling, i.e. an arrangement with coinciding optical axes.

Having thus described the invention with particular reference to preferred forms thereof, it will be obvious to those skilled in the art to which the invention pertains, after understanding the invention, that various changes and modifications may be made therein without departing from the spirit and scope of the invention as defined by the claims appended hereto.

We claim:

1. A coupling arrangement for coupling light of a semiconductor laser diode into a multimode glass fiber, the arrangement comprising:
   (a) a semiconductor laser diode which emits light along a first optical axis; and
   (b) a multimode glass fiber which has a light entry surface and receives the emitted light through its light entry surface and guides the received light along a second optical axis, said received light forming a maximum intersection angle with the second optical axis;
   the first and second optical axes extending apart from, and parallel with, each other such that said maximum intersection angle is greater than when the first and second axes coincide, light emitted by the semiconductor laser diode being in the form of a wedge having a plane of symmetry, said plane of symmetry containing the first optical axis, and the second optical axis being apart from the plane of symmetry along a direction extending perpendicular to the plane of symmetry, and
   the wedge having an angle of aperture of about 10° and the maximum intersection angle being up to about 8°.

2. A coupling arrangement according to claim 1, wherein the light entry surface of the glass fiber is spherically shaped.

* * * * *